(12) United States Patent
Vulcan (10) Patent No.: US 11,040,405 B2
(45) Date of Patent: Jun. 22, 2021

(54) METHOD AND DEVICE FOR SHEARING ROD MATERIAL

(71) Applicant: Hatebur Umformmaschinen AG, Reinach (CH)

(72) Inventor: Mihai Vulcan, Hofstetten (CH)

(73) Assignee: Hatebur Umformmaschinen AG, Reinach (CH)

( * ) Notice: Subject to any disclaimer, the term of this patent is extended or adjusted under 35 U.S.C. 154(b) by 0 days.

(21) Appl. No.: 16/317,959

(22) PCT Filed: Jul. 18, 2017

(86) PCT No.: PCT/EP2017/068095
§ 371 (c)(1),
(2) Date: Jan. 15, 2019

(87) PCT Pub. No.: WO2018/015370
PCT Pub. Date: Jan. 25, 2018

(65) Prior Publication Data
US 2019/0291190 A1    Sep. 26, 2019

(30) Foreign Application Priority Data

Jul. 19, 2016  (CH) .................................. 00923/16

(51) Int. Cl.
*B23D 33/02* (2006.01)
*B23D 15/04* (2006.01)
*B21F 11/00* (2006.01)

(52) U.S. Cl.
CPC ............. *B23D 33/02* (2013.01); *B23D 15/04* (2013.01); *B21F 11/00* (2013.01)

(58) Field of Classification Search
CPC ......... B21F 11/00; B23D 15/04; B23D 33/02; B23D 23/00; B23D 33/00
(Continued)

(56) References Cited

U.S. PATENT DOCUMENTS 2,446,146 A * 7/1948 Tucker .................. B23D 33/10
83/391
3,590,674 A * 7/1971 Maeda .................. B23D 23/00
83/14
(Continued)

FOREIGN PATENT DOCUMENTS

CH          602291 A5      7/1978
CH          702984 B1 * 10/2011 ............. B23D 33/10
(Continued)

*Primary Examiner* — Ghassem Alie
(74) *Attorney, Agent, or Firm* — The Webb Law Firm (57) ABSTRACT

A method is disclosed for shearing an end section from a rod material by means of a cutting blade that is movable against a stationary blade, transversely with respect to the longitudinal direction of the rod material, during the shearing operation. The end section to be sheared is brought into contact on its end-face side with a longitudinal stop and is acted on, via the longitudinal stop, with a pressure force in the longitudinal direction of the rod material. The action of pressure force on the end section takes place during the shearing operation with a position-controlled longitudinal position of the longitudinal stop. It is thus possible to manage with a lower pressure force than with conventional force-controlled pressure force action, without the shearing quality of the separation faces at the end section being impaired.

12 Claims, 11 Drawing Sheets

(58) Field of Classification Search
USPC ...... 83/16, 21, 111–112, 123, 156, 170, 196, 83/198, 200, 206, 276–278, 419
See application file for complete search history.

(56) References Cited

U.S. PATENT DOCUMENTS

| | | | | |
|---|---|---|---|---|
| 4,085,640 | A * | 4/1978 | Furuto | B21K 27/06 470/153 |
| 4,106,147 | A * | 8/1978 | Furuto | B21K 27/06 269/317 |
| 4,128,027 | A * | 12/1978 | Fuchs | B23D 15/14 83/198 |
| 4,319,504 | A * | 3/1982 | Wepner | B21D 28/20 267/119 |
| 4,445,410 | A * | 5/1984 | Lazar, Jr. | B23D 23/00 83/390 |
| 4,524,656 | A * | 6/1985 | Del Fabro | B21D 43/285 83/153 |
| 4,526,073 | A * | 7/1985 | Elhaus | B21K 27/06 83/15 |
| 4,651,602 | A * | 3/1987 | Harrold | B23D 23/00 83/15 |
| 4,677,838 | A * | 7/1987 | Bessey | B21J 1/06 72/254 |
| 4,761,980 | A * | 8/1988 | Kawashima | B21D 43/021 470/17 |
| 5,156,073 | A * | 10/1992 | Zanzerl | B21D 43/021 83/13 |
| 5,184,532 | A * | 2/1993 | Wengenroth | B23D 15/04 83/23 |
| 7,073,420 | B2 * | 7/2006 | Kuo | B23D 17/06 83/112 |
| 7,574,887 | B2 * | 8/2009 | Suter | B21K 27/06 72/338 |
| 9,120,142 | B2 * | 9/2015 | Matt | B21K 1/761 |
| 2007/0251363 | A1 * | 11/2007 | Shiokawa | B23D 33/02 83/55 |
| 2012/0131977 | A1 * | 5/2012 | Matt | B21K 27/06 72/337 |
| 2015/0068373 | A1 * | 3/2015 | Armitage | B23D 21/00 83/13 |

FOREIGN PATENT DOCUMENTS

| | | | |
|---|---|---|---|
| CH | 702984 | B1 | 10/2011 |
| DE | 1802643 | | 6/1969 |
| DE | 1815691 | A1 * | 7/1970 ............ B23D 21/00 |
| DE | 2121300 | | 12/1971 |
| DE | 10324730 | A1 | 12/2004 |
| EP | 0196466 | A2 | 10/1986 |
| EP | 0420820 | A1 | 4/1991 |
| JP | S4842487 | A | 6/1973 |
| JP | S62072744 | U | 5/1987 |
| JP | H551525 | U | 7/1993 |
| JP | H08150511 | A | 6/1996 |
| WO | 2012006751 | A1 | 1/2012 |
| WO | 2018015370 | A1 | 1/2018 |

* cited by examiner

METHOD AND DEVICE FOR SHEARING ROD MATERIAL

CROSS-REFERENCE TO RELATED APPLICATIONS

This application is the United States national phase of International Application No. PCT/EP2017/068095 filed Jul. 18, 2017, and claims priority to Switzerland Patent Application No. 00923/16 filed Jul. 19, 2016, the disclosures of which are hereby incorporated in their entirety by reference.

BACKGROUND OF THE INVENTION

Field of the Invention

The invention relates to a method for shearing an end section from a rod material according to the preamble of independent claim 1, and a device for carrying out the method according to the preamble of independent claim 9.

Description of Related Art

Shearing methods and corresponding devices of the generic type are generally known, for example from CH 702 984 B1, and are used, for example, in the production of molded parts made of metallic materials. In such methods, typically a metallic rod material is introduced to between a stationary blade that is fixed in place and a cutting blade that is movable relative thereto, wherein an end section of the rod material to be sheared protrudes in the longitudinal direction beyond the shear plane defined by the stationary blade and the cutting blade. The cutting blade is then guided against the stationary blade, transversely with respect to the rod material, thus shearing off the end section from the rod material.

In the present context, "rod material" is understood to mean any form of material with a pronounced longitudinal extension and an arbitrary cross section that is constant across the longitudinal extension. In particular metallic bars, rods, and wires of any dimension fall under this definition. Circular cross sections are most common, although the invention is not limited thereto. The term "rod-shaped" is understood in an analogous manner. The term "end section" is understood to mean a section at the end of the rod material that is unmachined or also machined, for example formed.

As a result of the shearing, deformation (so-called "retraction") occurs at the sheared section or at the remaining part of the rod. The extent of the deformation is determined by the deformability of the material of which the rod material is made. The deformability of a steel material depends, among other things, on the temperature and the state of stress. The higher the temperature or the state of compressive stress, the greater the deformability. From the standpoint of forming technology, material flow takes place during cold shearing as well as hot shearing.

Figure 4:
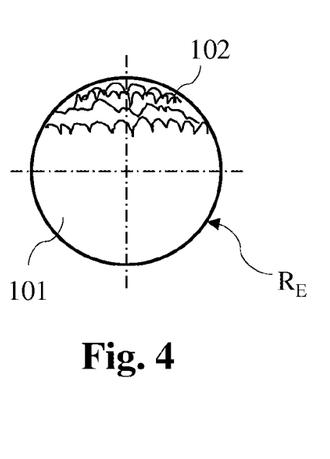
FIG. 4 shows an enlarged top view of a shear surface.

For the shearing of rods, the shear surface at the sheared-off section is usually composed of multiple parts. On the one hand the shear surface is made up of a smooth, flat so-called cutting face having a low surface roughness, and on the other hand, a fracture face having areas with different surface roughnesses (FIG. 4). The rough, brittle (fracture) face, also referred to as a "breakout", results when the deformability of the material is exhausted. The quality of the shear surface for a given material is determined by the state of stress and the temperature of the separation zone during the shearing operation.

The development of retraction caused by the plastic deformation on account of the higher deformability results in displacement of the material from the shear zone between the two blades (generally a stationary blade and a movable blade). In particular for hot shearing, the rod is usually supported on a longitudinal stop to prevent the shear surfaces from forming at an angle with respect to one another. Due to the longitudinal stop, the displacement of the material from the shear zone gives rise to a reaction force, which results in an increase in the compressive stress in the shear zone or separation zone. This state of stress is higher the smaller the play of the blades. A closed shape, in particular of the movable cutting blade, is therefore more advantageous than an open shape (half-shell).

In known shearing devices, the longitudinal stop during hot shearing fulfills two functions: on the one hand, it determines the section length, which may also optionally be set when the machine is running, for example to achieve a compensation in volume due to tool wear. On the other hand, the longitudinal stop "recognizes" the section length by means of a force sensor which delivers an appropriate signal to the machine controller for further processing in the forming machine, or for removal if this signal has insufficient strength or is nonexistent ("section is too short").

In the shearing device known from CH 702 984 B1, for example, the end section of the rod material to be sheared is acted on by a pressure force in a force-controlled manner That is, the pressure force that the stop exerts on the end section is set by means of a hydraulic control system in such a way that it follows a predefined time-force course (force control variable) over the shearing stroke. Typical examples of such a time-force course are a constant force over the majority of the shearing stroke (rectangular pattern) or a rapid rise and a slower drop of the force over the shearing stroke (triangular pattern).

To achieve high shearing quality of the separation faces at the end section, the pressure force exerted on the end section in these known shearing devices, which operate by action of pressure in a force-controlled manner, is generally relatively large. This imposes high demands on the design of the shearing device, and results in increased wear on the mechanical components of the shearing device, in particular the drive of the longitudinal stop. In addition, there is a risk that the end section to be sheared may be compressed in the longitudinal direction due to the high action of pressure.

An object of the invention, therefore, is to improve a method and a device of the types mentioned at the outset, such that it is possible to manage with preferably lower pressure forces exerted on the end section, without having to accept losses in the shearing quality.

SUMMARY OF THE INVENTION

This object is achieved by the method according to the invention and the device according to the invention as described herein.

With regard to the method, the essence of the invention is as follows: In a method for shearing an end section from a rod material by means of a cutting blade that is movable against a stationary blade, transversely with respect to the longitudinal direction of the rod material, the end section to be sheared is brought into contact on its end-face side with a longitudinal stop, and during the shearing operation is acted on, via the longitudinal stop, with a pressure force in the longitudinal direction of the rod material. The action of pressure force on the end section during the shearing operation takes place with a position-controlled longitudinal position of the longitudinal stop.

The longitudinal position of the longitudinal stop is preferably controlled to a constant value during the shearing operation.

Due to the position-controlled action of pressure force on the end section, it is possible to manage with a lower pressure force than with conventional force-controlled pressure force action, without the shearing quality of the separation faces at the end section being impaired. The mechanical stress and the wear on the shearing device are thus reduced.

The course of the pressure force exerted by the longitudinal stop on the end section during the shearing operation is advantageously measured. This allows an assessment of the quality of the shear surface. Thus, according to one advantageous embodiment of the method, the course of the measured pressure force is evaluated in order to assess the quality of the shear surface of the end section. The "course of the pressure force during the shearing operation" is understood to mean the time course and/or the course over the shear path.

According to one advantageous embodiment of the method, when it is determined, preferably based on the course of the measured pressure force, that the quality of the shear surface of the end section is inadequate, a change is made to an operating mode in which the action of pressure force on the end section to be sheared takes place in a force-controlled manner, wherein the pressure force exerted by the longitudinal stop on the end section to be sheared is controlled according to a predefined force control variable. In this way, even end sections for which the position-controlled action of pressure does not lead to the desired shearing quality may be sheared.

The quality of the shear surface is advantageously assessed as inadequate when the course of the measured pressure force has a dip prior to the end of the shearing operation, in which the course of the pressure force, disregarding control-related fluctuations, drops to a minimum and then rises again.

The quality of the shear surface is assessed as inadequate in particular when the course of the measured pressure force rises from the minimum by a difference that is at least 10%, preferably 15% to 30%, of the maximum value of the measured pressure force.

The drop and subsequent rise of the course of the measured pressure force is an indicator of a breakout.

Furthermore, the quality of the shear surface may also be assessed as inadequate when the course of the measured pressure force prior to the end of the shearing operation drops to a value that is less than or equal to zero.

A device that is suitable for carrying out the method according to the invention for shearing an end section from a rod material comprises a stationary blade, a cutting blade that is movably driven against the stationary blade, transversely with respect to the longitudinal direction of the rod material, a longitudinal stop, which is movable in the longitudinal direction, for the end section of the rod material to be sheared, and a hydraulic system for moving the longitudinal stop and acting with a pressure force, via the longitudinal stop, on the end section in the longitudinal direction of the rod material during the shearing operation. The device has a position measuring apparatus for detecting the longitudinal position of the longitudinal stop, and a controller that is designed for controlling the hydraulic system based on the longitudinal position of the longitudinal stop detected by the position measuring apparatus, wherein the longitudinal position of the longitudinal stop is controllable by the controller via the hydraulic system, controlled by same, according to a predefined position control variable.

The position measuring apparatus, the controller, and the hydraulic system together allow the end section to be acted on by the pressure force with a position-controlled longitudinal position of the longitudinal stop, and allow the position-controlled movement of the longitudinal stop before and after the actual shearing operation.

The controller is advantageously designed for controlling the longitudinal position of the longitudinal stop to a constant value during the shearing operation.

The hydraulic system advantageously includes a servo valve that is continuously settable by the controller. Particularly precise and rapid control is possible with such a servo valve.

The device advantageously includes a measuring system for measuring the pressure force exerted by the longitudinal stop on the end section to be sheared. Thereby, on the one hand, control of the pressure force that occurs is possible, and on the other hand the measured pressure force may be used for other purposes, in particular for assessing the achieved shearing quality.

The device advantageously includes a stop piston that is kinematically connected to the longitudinal stop and drivable by the hydraulic system by action by a hydraulic pressure medium, and the measuring system has pressure sensors for detecting the pressure of the hydraulic pressure medium on both sides of the stop piston. The time course of the pressure force acting on the longitudinal stop may thus be easily detected.

According to one advantageous embodiment, the controller is designed for controlling the pressure force exerted by the longitudinal stop on the end section to be sheared, via the hydraulic system according to a predefined force control variable. The action of pressure force on the end section may thus also take place in a force-controlled manner, which in general is particularly meaningful when the position-controlled action of pressure does not result in the desired shearing quality.

The device is advantageously designed to be switchable between two operating modes, wherein the action of pressure force on the end section to be sheared takes place in one operating mode with a position-controlled longitudinal position of the longitudinal stop, and in the other operating mode takes place in a force-controlled manner. The device may thus be used in a more universal way.

BRIEF DESCRIPTION OF THE DRAWINGS

The method according to the invention and the device according to the invention are described in greater detail below with reference to the appended drawings, based on exemplary embodiments. The drawings show the following.

DESCRIPTION OF THE INVENTION

The following applies for the description below: If reference numerals are indicated in a figure for the purpose of clarity of the illustrations, but are not mentioned in the directly associated portion of the description, reference is made to their explanation in the preceding or subsequent portions of the description. Conversely, to avoid excessive detail in the illustrations, reference numerals that are less relevant for direct understanding are not provided in all figures. In this regard, reference is made to the respective other figures.

Figure 1:
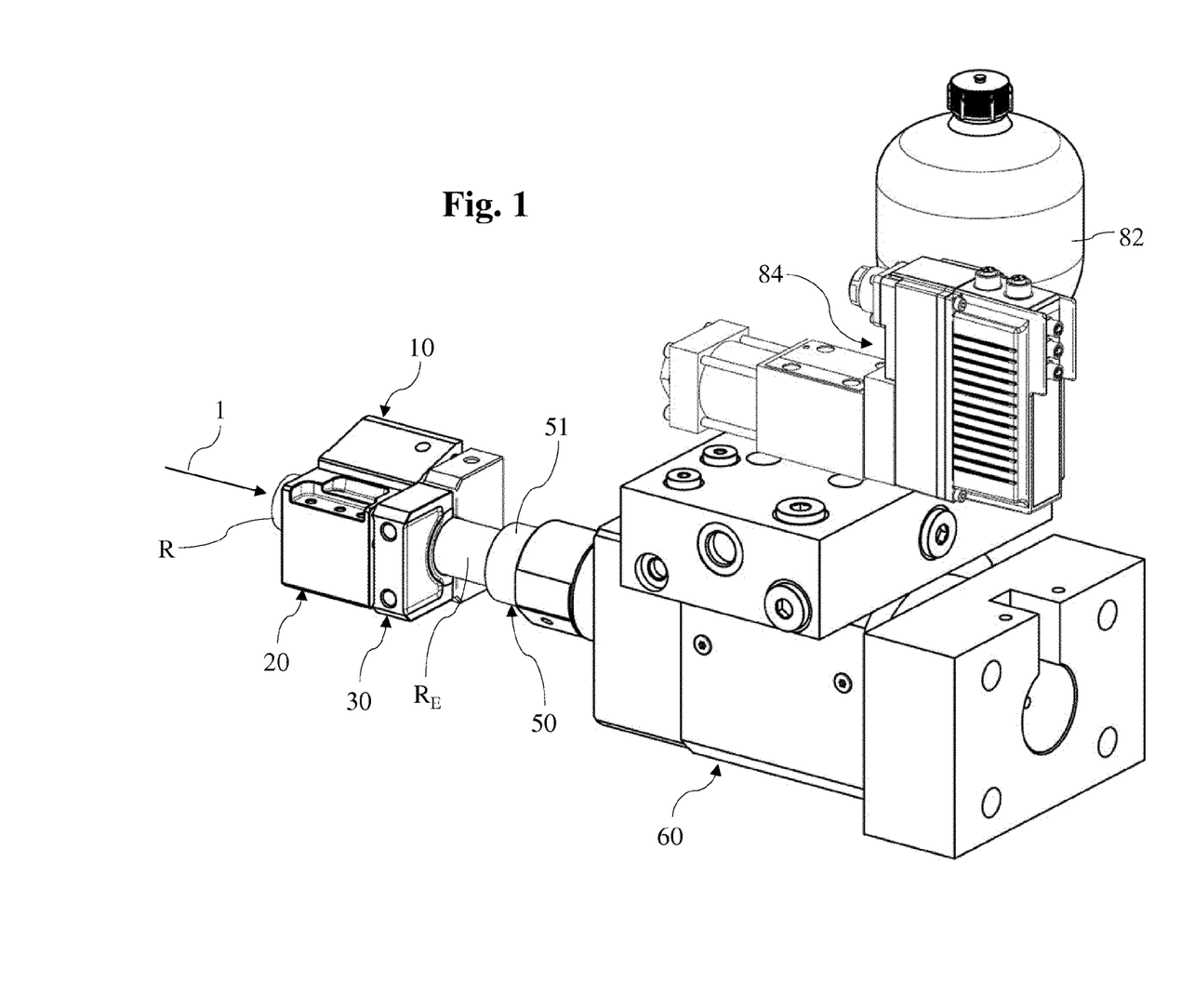
FIG. 1 shows a perspective overall view of one exemplary embodiment of the device according to the invention.
Figure 2:
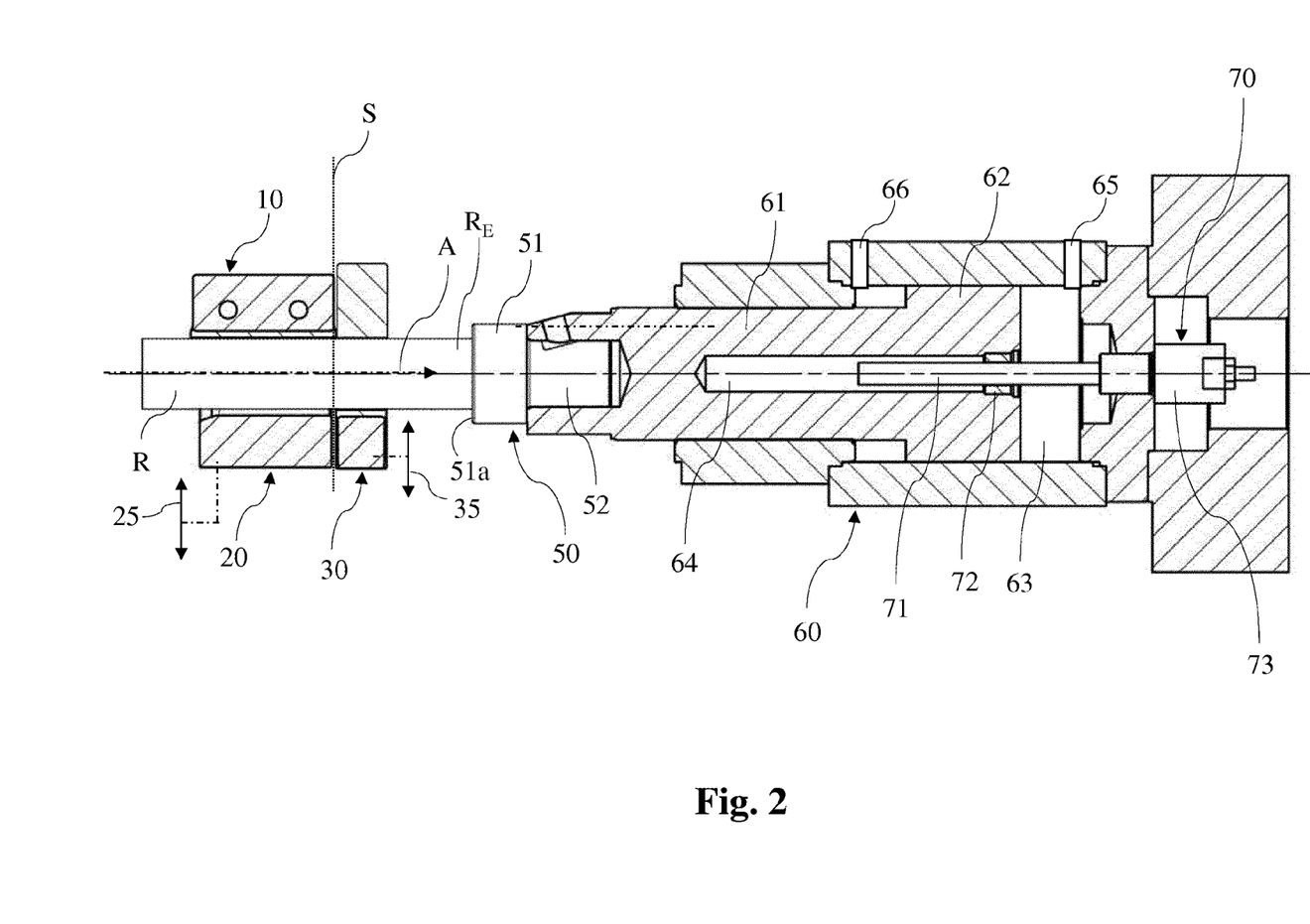
FIG. 2 shows a longitudinal section of the important parts of the device according to FIG. 1.
Figure 3:
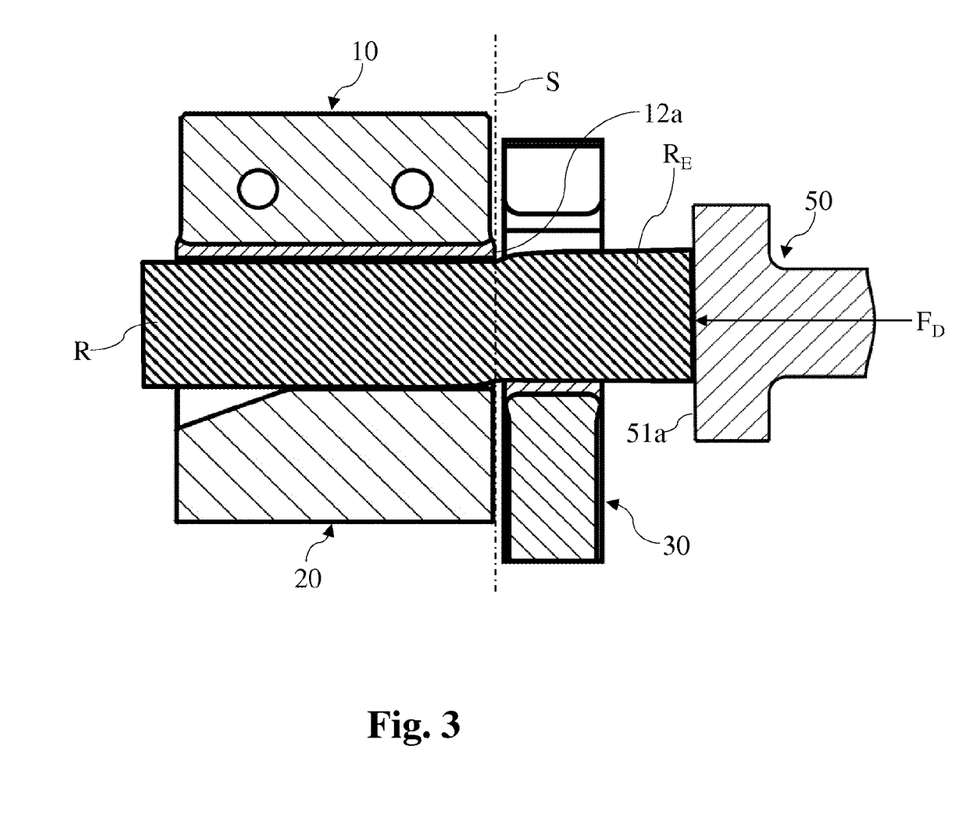
FIG. 3 shows an enlarged illustration of a portion of the device from FIG. 2 during the shearing operation.

The device illustrated in FIGS. 1-3 essentially comprises a stationary blade 10 that is fixed in place, a clamping device 20, a movably driven cutting blade 30, and a longitudinal stop 50. The stationary blade 10 and likewise the clamping device 20 have an approximately semicircular cross section. The stationary blade 10 and the clamping device 20 form a channel between them, through which a metallic rod material R is inserted and passed through in the longitudinal direction A (FIG. 2) until the front end of the rod material R with its end-face side comes into contact with the longitudinal stop 50.

The stationary blade 10 and the movable cutting blade 30 are slightly offset in the longitudinal direction, and between them define a shear plane S. The shear plane S is normally perpendicular to the longitudinal direction A of the rod material R. The piece of the rod material R that protrudes beyond the stationary blade 10 and the shear plane S until reaching the longitudinal stop 50 forms an end section $R_E$, which is sheared off from the remainder of the rod material R by the device.

The movable cutting blade 30 is driven by a drive means, known per se, which is symbolized in the drawing by an arrow 35. The shearing movement runs in the direction toward the stationary blade 10. The actual shear path thereby covered is defined as the route of the cutting blade 30 between its engagement with the rod material R and the complete shearing of the end section $R_E$ from the rod material R, and thus corresponds essentially to the transverse dimension of the rod material R in the direction of movement of the cutting blade 30.

For inserting or feeding the rod material R, feed means, known per se, symbolized in the drawing only by an arrow 1 are provided which include, for example, an openable and closable retraction apparatus which engages at the circumference of the rod material R, and which is movably drivable back and forth in the longitudinal direction.

The rod material R may be held in the longitudinal direction during the shearing operation by means of the clamping device 20. For this purpose, the clamping device 20 is pressable against the rod material R. The drive means, known per se, required for this purpose are symbolized in the drawing by an arrow 25.

As further shown in FIG. 2, the longitudinal stop 50 has a stop head 51, widened in the manner of an anvil, and a stop shank 52 that extends parallel to the longitudinal direction of the rod material R. During the shearing operation, the rod material R and its end section $R_E$ are in contact on the end-face side with the front face or end face 51a of the stop head 51. The front face or end face 51a extends perpendicularly, or preferably inclined at an angle of 90°-88°, with respect to the longitudinal direction (axis) of the rod material R.

The stop shank 52 is screwed to a coaxial piston rod 61 and is thus kinematically coupled in the longitudinal direction. The piston rod 61 is in turn kinematically connected to a stop piston 62, in particular in a one-piece design with same. The stop piston 62 and its piston rod 61 are axially movably supported in a piston chamber 63 of a stationary piston housing 60. Connecting lines 65 and 66 for a hydraulic medium open into the piston chamber 63, in the axial or longitudinal direction in front of and behind the piston 62. The stop piston 62, and thus indirectly also the longitudinal stop 50, may be acted on with pressure in the direction toward the end section $R_E$ of the rod material R via the connecting line 65. The pressure force generated by this action of pressure is denoted by reference sign $F_D$ in FIG. 3. The stop piston 62, and thus indirectly also the longitudinal stop 50, may be moved in the opposite direction via the connecting line 66.

The piston rod 61 and the stop piston 62 have an axial borehole 64 into which a rod-shaped position measuring probe 71 of a position measuring apparatus 70 extends. The position measuring probe 71 is stationary. Situated in the stop piston 62 is a position magnet 72 which annularly surrounds the position measuring probe 71 and which is movable together with the stop piston 62. The position measuring apparatus 70 operates according to the magnetostrictive principle. A ferromagnetic measuring element (waveguide) is situated within the position measuring probe 71, and is thus protected. The moved position magnet 72 generates a longitudinal magnetic field in the waveguide. When a current pulse runs through the position measuring probe 71, a second magnetic field results which extends radially around the longitudinal magnetic field. The meeting of both magnetic fields at the measuring point induces angular momentum in the waveguide. This angular momentum runs as a torsional structure-borne sound wave at ultrasonic speed from the measuring point to a sensor electronics system 73 at the head of the position measuring probe 71. The sensor electronics system 73 detects the structure-borne sound wave with high accuracy, and converts it into displacement-proportional position signals, on the basis of which the axial position of the stop piston 62 and thus also the axial position of the longitudinal stop 50 are detectable. The position measuring apparatus 70 preferably has a very high resolution in the range of 1 μm.

Figure 5:
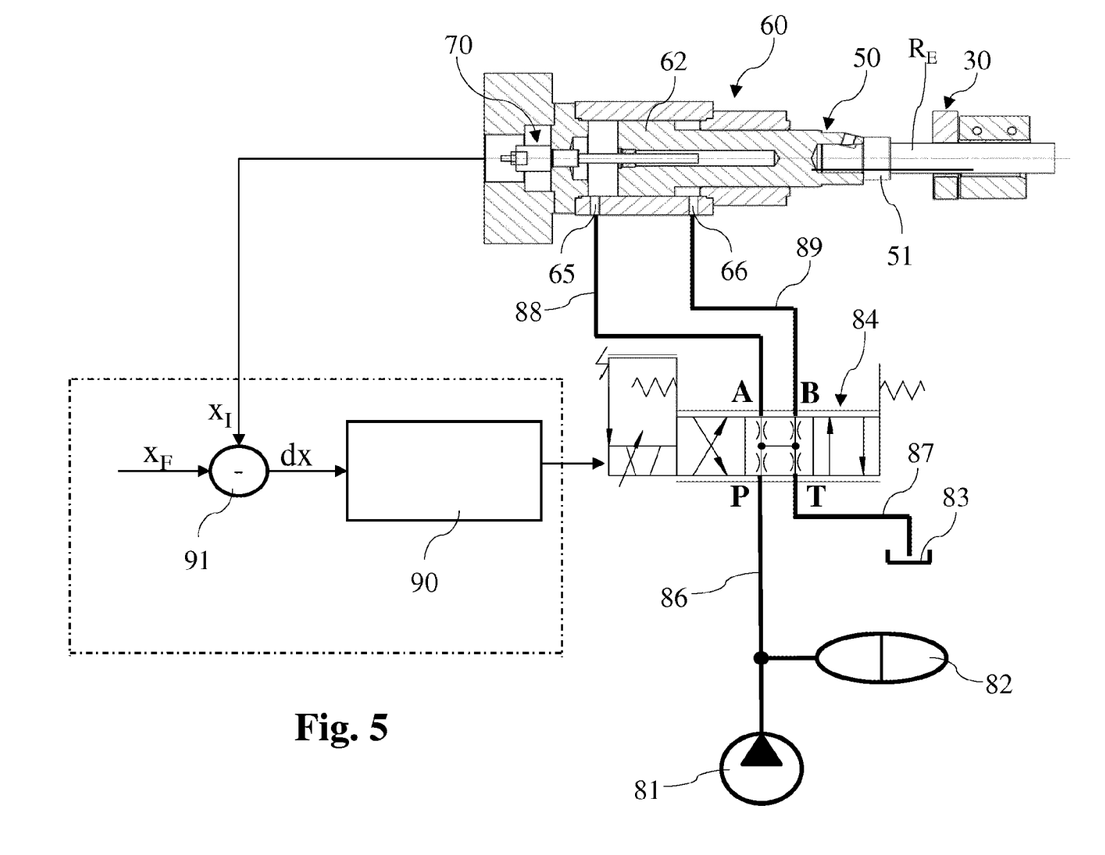
FIGS. 5-8 each show a diagram of different variants of the device.

FIG. 5 schematically illustrates a first variant of a hydraulic system by means of which the action of pressure on the longitudinal stop 50, and thus on the end section $R_E$ of the rod material R to be sheared, is implemented indirectly via the stop piston 62 in the piston housing 60.

The hydraulic system includes a hydraulic pressure supply 81, a hydraulic pressure store 82, a hydraulic tank 83, and a continuously controllable servo valve 84. The servo valve 84 is controlled by a controller 90 that cooperates with the position measuring apparatus 70. The hydraulic pressure store 82 is in communicating connection with the connecting lines 65 and 66 in the piston housing 60 via the servo valve 84 (depending on the position thereof). The hydraulic tank 83 is connected to the servo valve 84. The corresponding lines conducting hydraulic medium are denoted by reference numerals 86, 87, 88, and 89. In practice, as is apparent from FIG. 1, the servo valve 84 is mounted directly on the piston housing 60, so that the two lines 88 and 89 may be very short.

The basic operating principle of the hydraulic system is as follows:

As the result of the servo valve 84 opening due to control by the controller 90, pressurized hydraulic medium flows from the hydraulic pressure store 82, via the line 88, into the piston housing 60 and acts on the stop piston 62, thus moving it. The line 89 is connected to the line 87, so that the displaced hydraulic medium is able to flow into the hydraulic tank 82. The controlled pressure buildup in the piston housing takes place by appropriate control of the servo valve 84 via the controller 90, in timing with the movement of the cutting blade 30. To reduce the pressure, the servo valve 84 is adjusted in such a way that the line 88 is connected to the line 87, and the hydraulic medium is able to flow into the hydraulic tank 82.

To reset the stop piston 62, the servo valve 84 is set in such a way that hydraulic medium is able to flow from the hydraulic pressure store 82, via the line 89, into the piston housing 60 and act on the piston from the other side. The line 88 is connected to the line 87, so that the displaced hydraulic medium is able to flow into the hydraulic tank 82. Alternatively, an appropriately situated spring assembly or the like may be provided for resetting the stop piston 62. It is also possible for the stop piston 62 to be reset by the feed movement of the rod material R.

The basic operating principle of the method according to the invention is as follows:

At the beginning of a method cycle, the rod material R is moved in the longitudinal direction A between the stationary blade 10 and the movable cutting blade 30, shown in the starting position in FIG. 1, until the leading end of the rod material with its end face rests against the end face 51a of the stop head 51 of the longitudinal stop 50, i.e., the rod material R with its end section $R_E$ to be sheared is in contact with the longitudinal stop 50.

In the next method step, the rod material R is pressed against the stationary blade 10 by means of the clamping device 20, and is thus secured against displacement in the longitudinal direction (FIG. 3).

The shearing operation subsequently begins. For this purpose, the movable cutting blade 30 is moved transversely with respect to the longitudinal direction of the rod material R in the direction of the stationary blade 10. As soon as the movable cutting blade 30 comes into engagement with the rod material R, the rod material is pressed against the stationary blade 10, so that the stationary blade 10 with its shear lip 12a also comes into engagement with the rod material R.

Immediately thereafter or with a slight delay, the longitudinal stop 50 is pressed against the end section $R_E$ of the rod material R via the stop piston 62, so that the end section $R_E$ is acted on by a pressure force $F_D$ in the longitudinal direction of the end section. At this point in time, the shear lip 12a of the stationary blade 10 is already engaged with the rod material R and supports same, so that the rod material is not able to move back under the pressure force $F_D$. This support in the longitudinal direction, is still assisted by the clamping device 20, if present.

The pressure force $F_D$ acting on the end section $R_E$ of the rod material R generates a state of compressive stress in the end section $R_E$ which is superimposed on the shear stresses and tensile stresses, and prevents crack formation and other undesirable artifacts.

The movable cutting blade 30 is now moved further transversely with respect to the rod material R, with application of pressure force $F_D$, until the end section $R_E$ is completely sheared off. The action of the pressure force $F_D$ on the end section $R_E$ is terminated just before, or at the latest at the end of, the shear path (when the end section $R_E$ is completely sheared off).

The sheared-off end section $R_E$ is now removed, and the movable cutting blade 30 and the longitudinal stop 50, and optionally the clamping device 20, are moved back to their respective starting positions. A new method cycle may now begin.

With the exception of the specific design of the hydraulic system and of the position measuring apparatus 70, the device according to the invention and the method according to the invention correspond to the known prior art, as described in detail in particular in CH 702 984 B1, discussed at the outset. Therefore, those skilled in the art require no further detailed discussion.

FIG. 4 shows a greatly simplified view of the shear surface of a sheared-off end section $R_E$. The shear surface is made up of a smooth, flat so-called cutting face 101 having a low surface roughness, and a fracture face 102 having areas with different surface roughnesses. The rough, brittle fracture face, or breakout 102, results when the capability of the material for deformation is exhausted.

During shearing of rod material, the force acting axially on the longitudinal stop 50 is approximately one-fourth of the shear force. The shear force is higher the greater the diameter of the rod to be sheared, or the lower the heating temperature. This results in relatively large forces that may bring about a certain deflection of the longitudinal stop after the play in the drive of the longitudinal stop itself has been eliminated. This deflection, which takes place in the tenths of a millimeter range, has a significant influence on the state of stress in the shear zone, and thus, on the deformability and the fracture behavior of the material.

To achieve the desired shearing quality of the separation faces on the section, the proportion of the fracture face or the breakout on the entire shear surface must be kept as small as possible by processing engineering and technical measures for the shearing process or the shearing device. As described in greater detail below, this takes place via an active contribution to the state of stress in the end section by means of the longitudinal stop 50.

According to one of the most important aspects of the invention, this active contribution to the state of stress takes place via an action of pressure force on the end section $R_E$ with a position-controlled longitudinal position of the longitudinal stop 50. This is understood to mean that the (axial) longitudinal position of the longitudinal stop 50 during the shearing operation is controlled to a constant value as soon as the longitudinal stop 50 is in contact with the end section $R_E$. The mentioned deflection of the longitudinal stop 50 is counteracted by the control of the position of the longitudinal stop 50, in that the hydraulic pressure acting on the longitudinal stop 50 via the stop piston 62, and thus, the force $F_D$ acting on the end section $R_E$, is appropriately controlled. This takes place by means of the controller 90, which controls the servo valve 84 and which is supplied with a position deviation dx formed by a subtractor 91 as an input variable, the position deviation resulting from the difference in the actual position x of the longitudinal stop 50, measured by the position measuring apparatus 70, and a position control variable (setpoint position) $x_F$ that is predefined and stored in the device. The position control variable is a constant value during the actual shearing operation. Based on the position deviation dx, the controller 90 controls, by means of the servo valve 84, the hydraulic pressures in the piston chamber 63 in such a way that the position deviation dx is minimized, and in the ideal case disappears, and the longitudinal stop 50 thus assumes or maintains its position predefined by the control variable $x_F$. Conversely, due to the position-controlled action of force on the end section $R_E$, the end section $R_E$ may also be prevented from being compressed to an undesirably high level due to an excessive axial action of force.

The target length of the end section $R_E$ to be sheared may also be set by means of the position control of the longitudinal position of the longitudinal stop 50. For this purpose, before the actual shearing operation begins, the longitudinal stop 50 is moved in the longitudinal direction, based on the control variable $x_F$ stored in the device, into a position that corresponds to the desired target length of the end section $R_E$.

Figure 6:
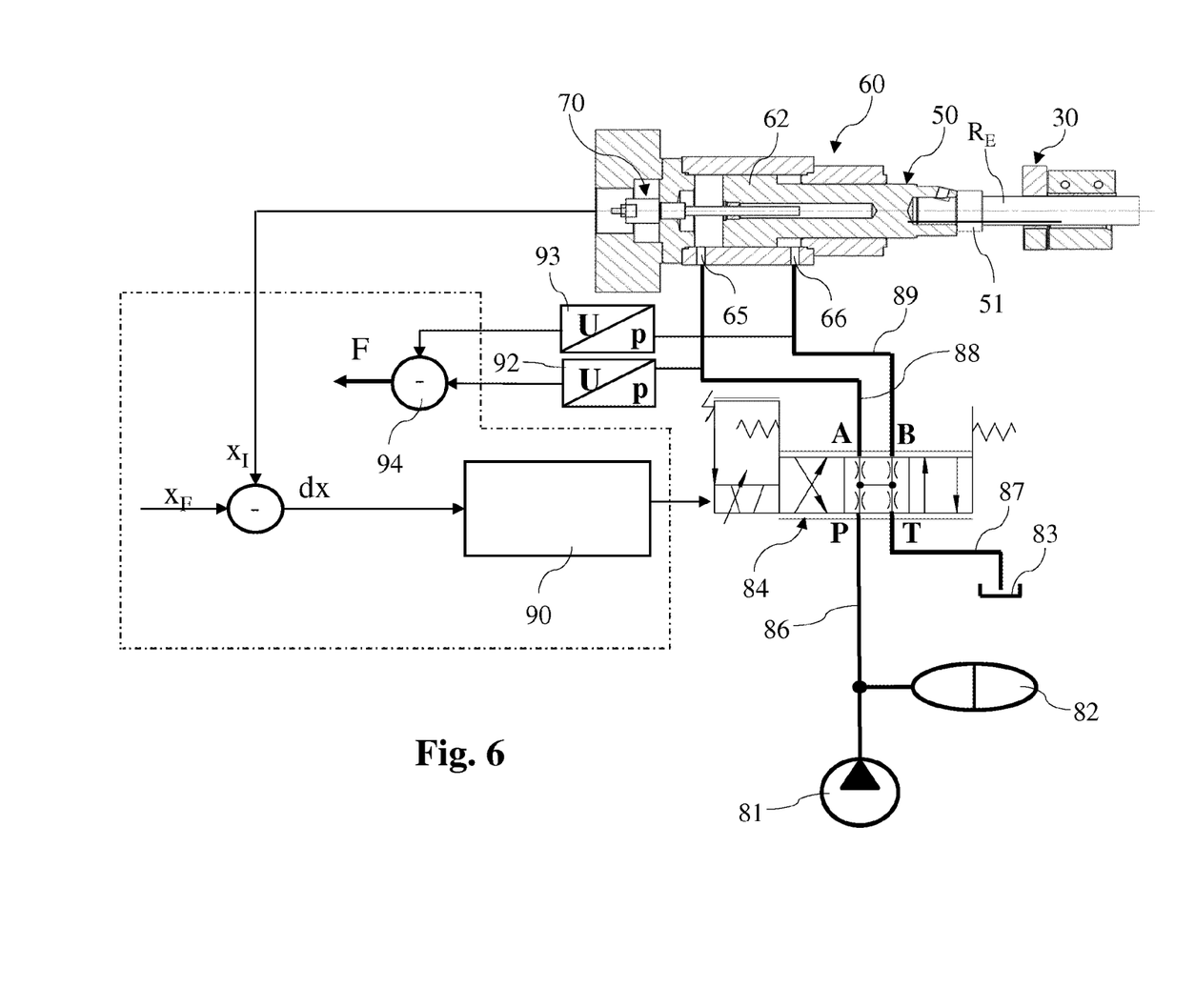

FIG. 6 illustrates a variant of the device which, compared to the variant according to FIG. 5, is additionally provided with a measuring system for measuring the pressure force F exerted by the longitudinal stop 50 on the end section $R_E$ to be sheared. The measuring system includes two pressure sensors (pressure-voltage converters) 92 and 93 and a subtractor 94. The two pressure sensors 92 and 93 measure the pressures in the lines 88 and 89, i.e., on both sides of the stop piston 62. The subtractor 94 forms the difference F, which, taking into account the piston surfaces, is a measure of the pressure force $F_D$ exerted by the longitudinal stop 50 on the end section $R_E$, and vice versa. The difference signal F may be used for section length monitoring, for example, wherein a value that is too low with respect to a default value indicates that the end section to be sheared is too short, or is lacking altogether. In addition, the difference signal F may be used for remote monitoring or diagnosing the achieved quality of the shear surface (formation of breakouts) during the shearing process. This is discussed in greater detail below.

Figure 7:
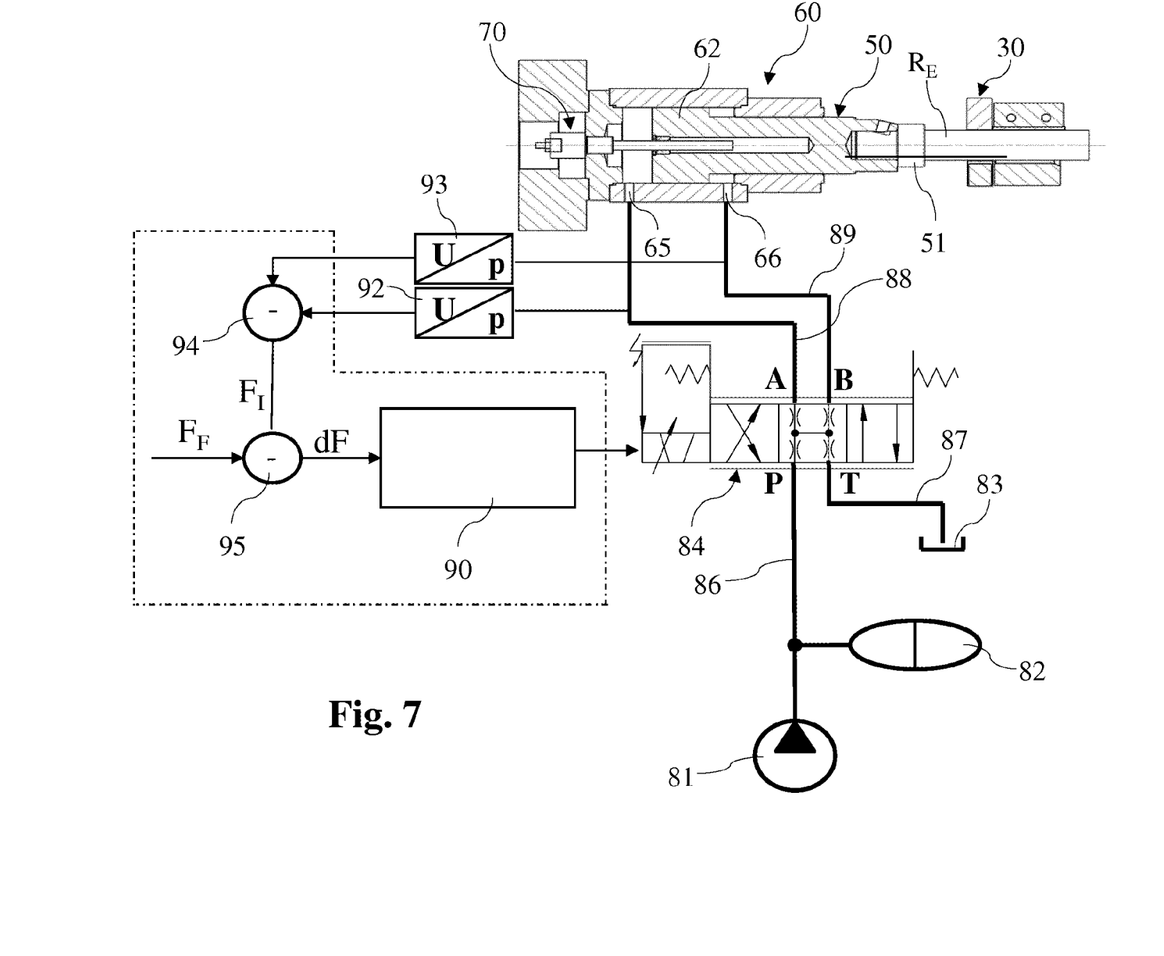

FIG. 7 illustrates a device variant which controls the pressure force $F_D$ acting on the end section $R_E$ based on a force control variable $F_F$ stored in the device (force control). The two pressure sensors (pressure-voltage converters) 92 and 93 measure the pressures in the lines 88 and 89, i.e., on both sides of the stop piston 62, and the subtractor 94 forms the pressure difference Fi, which is a measure of the pressure force $F_D$ acting on the end section $R_E$ (actual value). Another subtractor 95 forms the difference dF between the pressure difference Fi and the force control variable $F_F$. The controller 90, by means of the servo valve 84, controls the pressures in the piston chamber on both sides of the stop piston 62, based on the difference dF, in such a way that the pressure force $F_D$ acting on the end section $R_E$ follows the force control variable $F_F$. The force superposition function, for example a rectangle or triangle, is stored as a formulation in the form of the force control variable $F_F$ in the machine controller for the particular rod diameters, materials, and heating temperatures. In other respects, the hydraulic system has the same design as that in FIGS. 5 and 6. The hydraulic system in FIG. 7 is used for force-controlled action of pressure force on the end section $R_E$ to be sheared.

Figure 8:
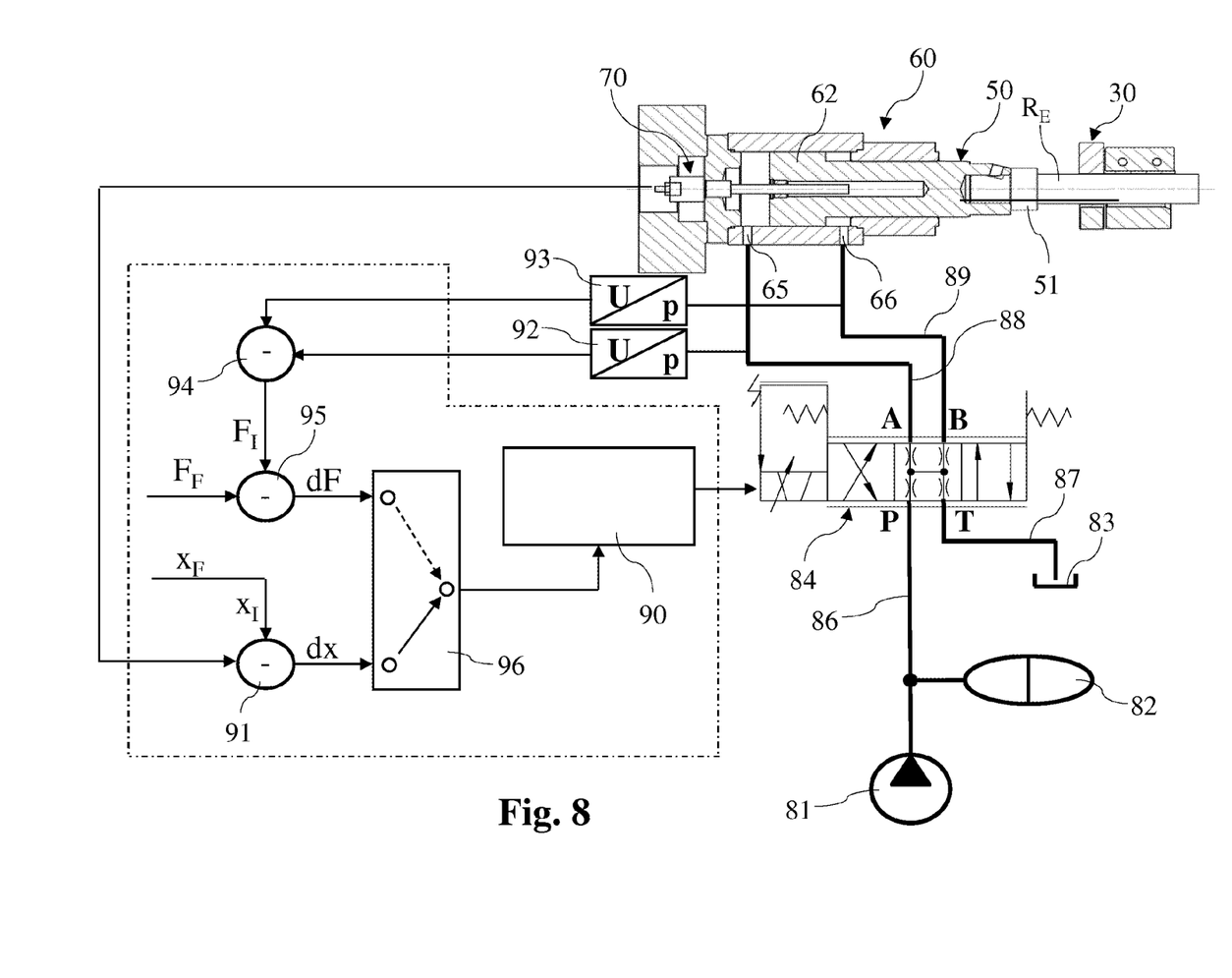

According to one particularly advantageous exemplary embodiment of the device according to the invention schematically illustrated in FIG. 8, the device is designed in such a way that it combines the features of the three variants described above, in that it allows a position-controlled as well as a force-controlled action of pressure force on the end section $R_E$, wherein by user control, in each case one or the other of the two control strategies (position control/force control) is used (symbolized in FIG. 8 by a switchover element 96). In this way, the most advantageous control strategy in each case may be selected, depending on the application (material, dimensions, temperature of the part to be sheared). This is discussed in greater detail below.

The components bordered by dash-dotted lines in FIGS. 5-8 are advantageously implemented by software, and in each case are expediently integrated into an overall control system for the shearing device or a facility equipped with the shearing device, typically a forming facility.

FIGS. 9-12 show typical courses of the stop force during the shearing operation for a rod material having a diameter of 32 mm in the present example. In this context, the stop force is understood to mean the force acting by the end section $R_E$ of the rod material R to be sheared on the longitudinal stop 50, which force may be measured, for example, as described with reference to FIG. 6. The stop force corresponds to the pressure force $F_D$ exerted by the longitudinal stop 50 on the end section, according to the principle that for every action, there is an equal and opposite reaction. The terms "pressure force $F_D$" and "stop force" are therefore used synonymously in the following discussion.

Figure 9:
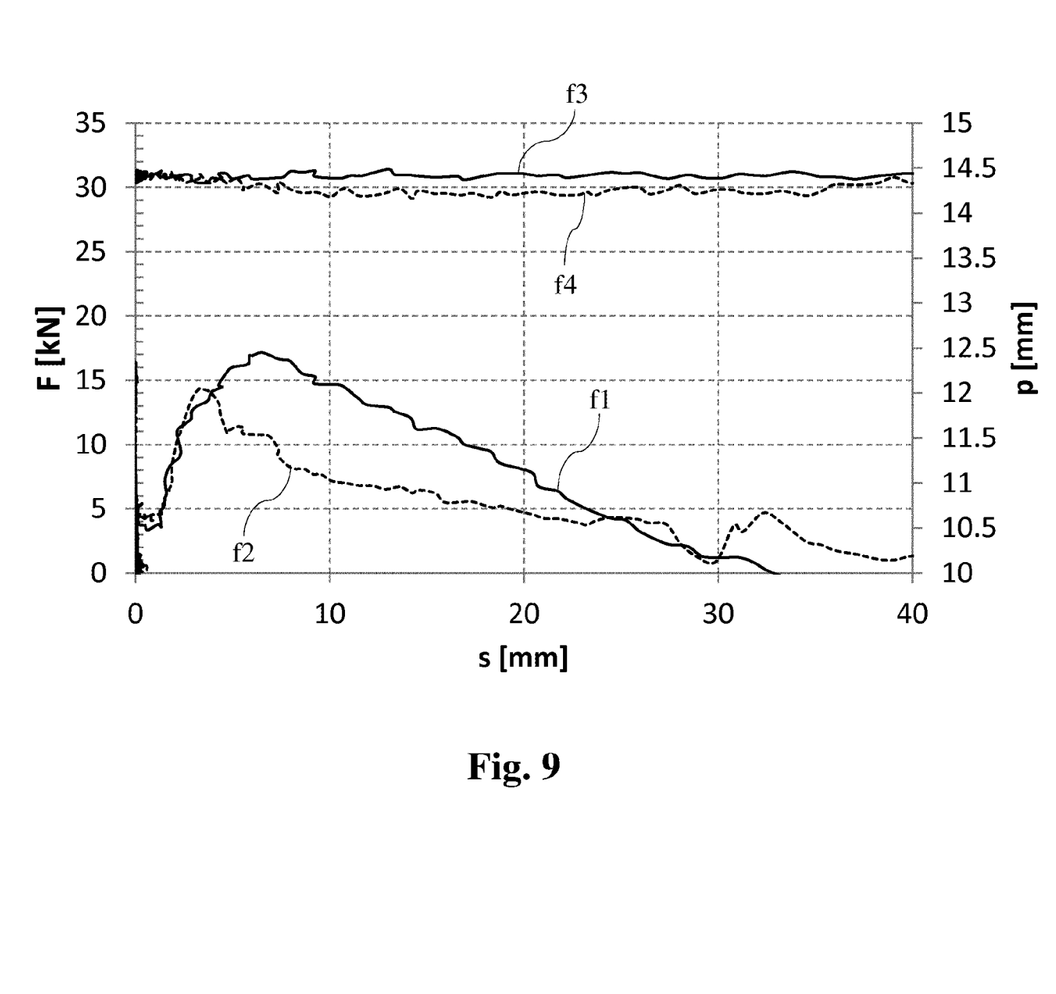
FIGS. 9-12 show various diagrams for explaining the courses of typical variables of the method according to the invention during the shearing operation.
Figure 10:
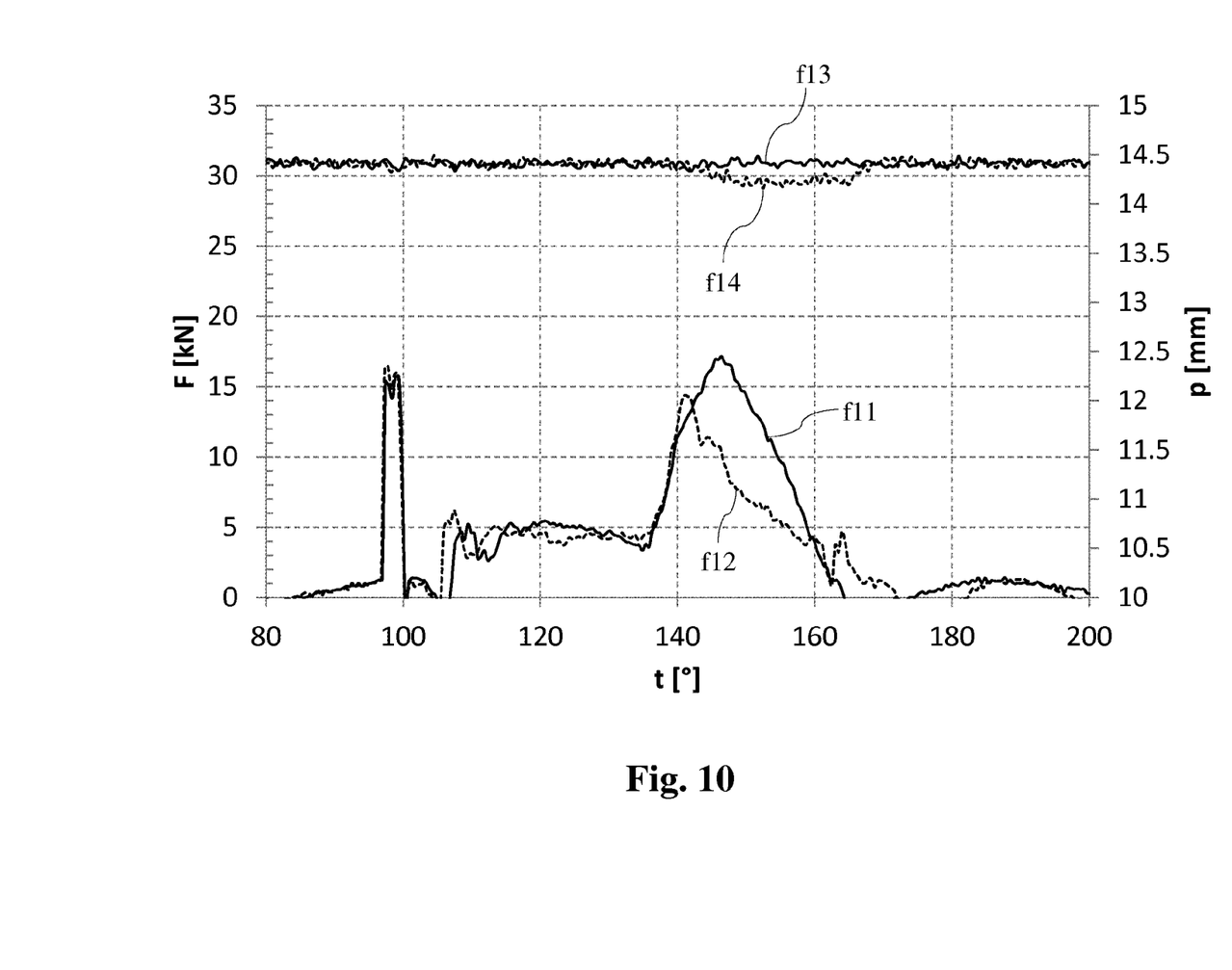
Figure 11:
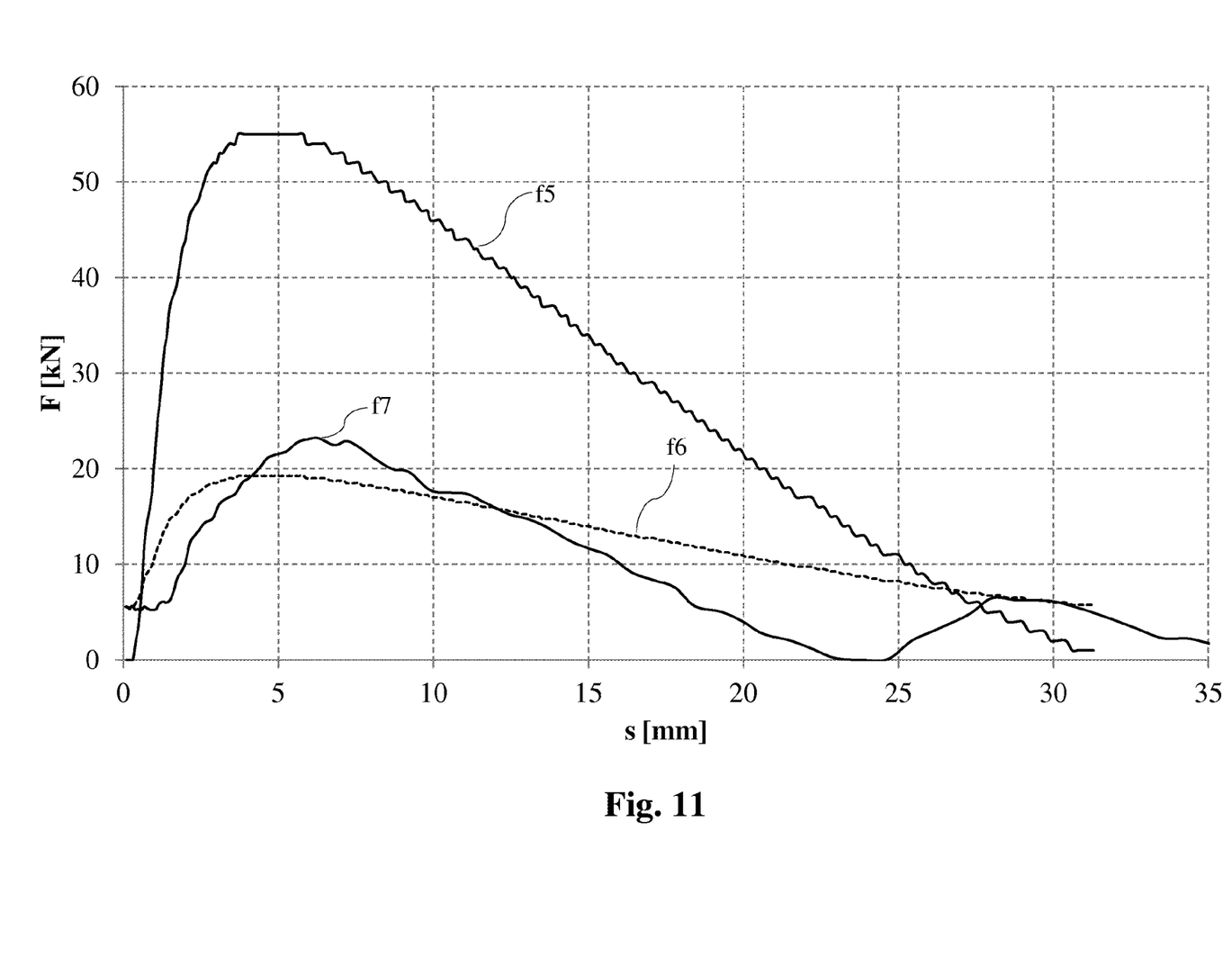
Figure 12:
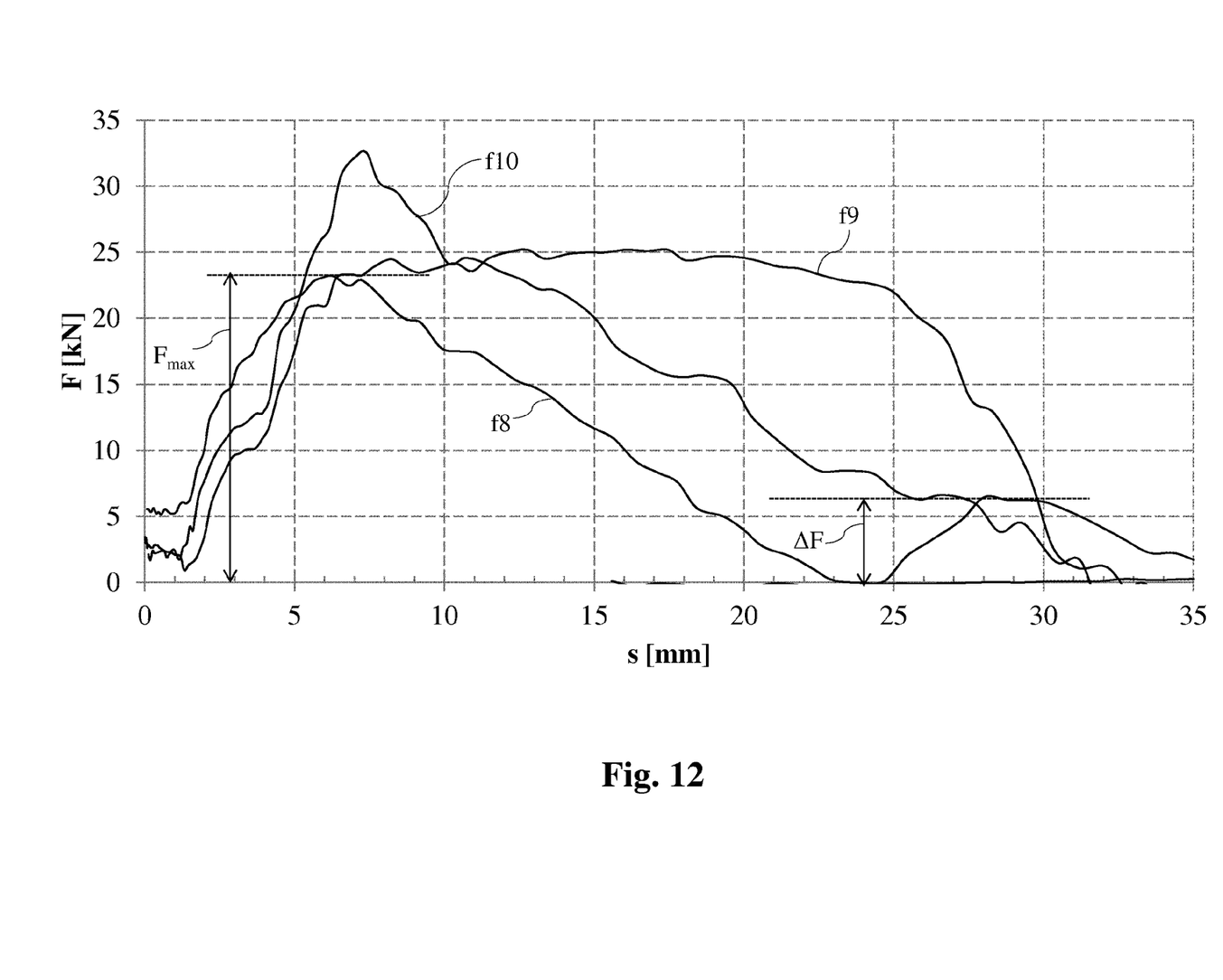

The shear path or shearing stroke s of the shearing blade is plotted on the abscissa in FIGS. 9, 11, and 12, which are thus force-displacement diagrams. A time t, expressed in angular degrees of the machine angle of the device, is plotted on the abscissa in FIG. 10, which is thus a force-time diagram. The actual shearing operation takes place, by way of example here, in a machine angle range of approximately 135° to 170°. The sections of the courses chronologically before and after represent the force conditions when the rod meets the stop (peak at approximately 95°) and during a subsequent resting phase or after completion of the actual shearing operation; these are not relevant for understanding the invention, and therefore are not explained in greater detail.

Curve f1 in FIG. 9 represents the course of the stop force as a function of the shearing stroke s for the position-controlled longitudinal stop 50 according to the invention. Curve f2 shows, in comparison, the course of the stop force when the position control of the longitudinal stop is not activated. At approximately 29 mm, curve f2 shows a very pronounced dip, which indicates the breakout that is forming. When the position control of the longitudinal stop is activated (curve f1), such a dip is absent, and the stop force decreases essentially uniformly until the end of the shearing operation. It has been shown that a course of the stop force which drops continuously from a maximum value, analogously to curve f1 in FIG. 9, is necessary for achieving satisfactory shearing quality.

The longitudinal position p of the longitudinal stop 50 is plotted on the right ordinate in FIG. 9. Curve f3 shows the position course of the longitudinal stop as a function of the shearing stroke s when position control is activated, and curve f4 shows the position course when position control is not activated. When position control is activated, the position course (except for minimal control fluctuations) is virtually constant, whereas when position control is not activated during the shearing operation, the position course deviates significantly from the (constant) setpoint course.

FIG. 10 shows the course of the stop force and the longitudinal position of the longitudinal stop as a function of time t, expressed in angular degrees. Curves f11 and f13 represent the courses during active position control, and curves f12 and f14 represent the courses when position control is not activated. FIG. 10 thus essentially corresponds to FIG. 9, except that the courses are depicted as a function of the time t, not the shearing stroke s.

FIG. 11 illustrates with curve f5 an (analytically calculated) course of the shear force as a function of the shearing stroke s. Curve f6 represents an (analytically calculated) course of the stop force as a function of the shearing stroke s. Lastly, curve f7 shows an actually measured course of the stop force as a function of the shearing stroke s, with position control of the longitudinal stop activated. It is apparent that the actually measured course of the stop force (curve f7), except for minor waves in the shearing stroke, has a very pronounced dip at approximately 24 mm; i.e., the measured stop force initially drops to a minimum and then within the shearing stroke once again sharply rises. In the present example, the minimum or the minimum value of the stop force course is less than zero. Such a dip indicates a breakout that is forming (end of the smooth section component in the section end surface). Shearing processes having such a course of the stop force generally do not result in satisfactory shearing quality. The quality of the shear surface may thus be checked based on the measured course of the stop force.

The shearing method according to the invention explained above, with action of pressure force on the end section to be sheared with a position-controlled longitudinal position of the longitudinal stop, results in a significant reduction in the machine load with nonetheless high quality of the shear surface, and at the same time avoids the risk of undesirable compression of the end section. However, depending on the material, dimensions, and temperature of the rod material, it is possible that the desired shearing quality is not achieved with this position-controlled action of pressure force. In this case, according to another important aspect of the invention, a change is made to force-controlled action of pressure force (FIG. 7), as known in principle from above-mentioned CH 702 984 B1, for example. The decision concerning this change in the control strategy (position control/force control) may be made by the operator of the shearing device, based on the course of the measured stop force F (FIG. 6) as a function of the shearing time or the shearing stroke. As previously explained with reference to FIG. 11, a dip forms in the stop force course at the start of the breakout. When this dip is excessively pronounced, this indicates that the control strategy should be changed; i.e., a switch should be made to force-controlled action of pressure force on the end section. Minor waves in the course pattern are not taken into account in the analysis of the course of the stop force. A dip in the course of the stop force is present when the measured stop force initially drops to a minimum and then within the shearing stroke once again sharply rises, whereby minor control-related fluctuations or waves in the course are disregarded. In particular, a dip is recognized as such when the course of the measured pressure force $F_D$ increases from the minimum by a difference $\Delta F$ that is at least 10%, preferably 15% to 30%, of the maximum value $F_{max}$ of the measured pressure force $F_D$ (see FIG. 12). The minimum of the measured stop force may also have a value less than or equal to zero.

In FIG. 12, curve f8 represents a measured course of the stop force with position control of the longitudinal stop activated, similar to curve f7 in FIG. 11. Curve f8 has a pronounced dip at approximately 24 mm in the shearing stroke, as a result of which the shearing quality will be deficient. The operator of the shearing device therefore switches the device to a control strategy with force-controlled action of pressure force on the end section to be sheared, so that the position control of the longitudinal stop is naturally deactivated. For example, two measured courses of the stop force with force control activated are illustrated in FIG. 12. Curve f9 shows the stop force with a force-controlled action of pressure force on the end section to be sheared with rectangular pressure superposition, and curve f10 shows the stop force with triangular pressure superposition. Pressure superposition is understood to mean the force course over the shearing stroke, defined by the force control variable $F_F$ (FIG. 7).

Further variations of the devices and methods described above may be implemented. In particular, the evaluation of the course of the stop force for assessment of the shearing quality, and the selection of the control strategy (position control/force control), could also take place in an automated manner by computer control.

The shearing method according to the invention and the corresponding device according to the invention are usable in conjunction with forming processes over the entire temperature range of hot forming, to forming at lowered temperature, all the way to cold forming.

The invention claimed is:

1. A method for shearing an end section from a rod material by means of a cutting blade that is movable against a stationary blade, transversely with respect to a longitudinal direction of the rod material comprising: bringing the end section to be sheared into contact on an end-face side with a longitudinal stop, and during the shearing operation acting on the end section, via the longitudinal stop, with a pressure force in the longitudinal direction of the rod material, wherein the action of pressure force on the end section during the shearing operation takes place with a position-controlled longitudinal position of the longitudinal stop, wherein a position measuring apparatus, controller and hydraulic system together allow the end section to be acted on by the pressure force with the position-controlled longitudinal position of the longitudinal stop, and wherein the longitudinal position of the longitudinal stop is controlled to a constant value during the shearing operation.

2. The method according to claim 1, wherein a course of the pressure force exerted by the longitudinal stop on the end section during the shearing operation is measured.

3. The method according to claim 2, wherein in the event of inadequate quality of the shear surface of the end section, a change is made to an operating mode in which the action of pressure force on the end section to be sheared takes place in a force-controlled manner, wherein the pressure force exerted by the longitudinal stop on the end section to be sheared is controlled according to a predefined force control variable.

4. The method according to claim 2, wherein the course of the measured pressure force is evaluated in order to assess the quality of a shear surface of the end section.

5. The method according to claim 4, wherein in the event of inadequate quality of the shear surface of the end section, a change is made to an operating mode in which the action of pressure force on the end section to be sheared takes place in a force-controlled manner, wherein the pressure force exerted by the longitudinal stop on the end section to be sheared is controlled according to a predefined force control variable.

6. The method according to claim 4, wherein in the event of inadequate quality of the shear surface of the end section, a change is made to an operating mode in which the action of pressure force on the end section to be sheared takes place in a force-controlled manner, wherein the pressure force exerted by the longitudinal stop on the end section to be sheared is controlled according to a predefined force control variable.

7. The method according to claim 6, wherein the quality of the shear surface is assessed as inadequate when the course of the measured pressure force has a dip prior to the end of the shearing operation, in which the course of the pressure force, disregarding control-related fluctuations, drops to a minimum and then rises again.

8. The method according to claim 4, wherein the quality of the shear surface is assessed as inadequate when the course of the measured pressure force has a dip prior to the end of the shearing operation, in which the course of the pressure force, disregarding control-related fluctuations, drops to a minimum and then rises again.

9. The method according to claim 8, wherein the quality of the shear surface is assessed as inadequate when the course of the measured pressure force rises from the minimum by a difference that is at least 10% of the maximum value of the measured pressure force.

10. The method according to claim 9, wherein the difference is 15% to 30% of the maximum value of the measured pressure force.

11. The method according to claim 8, wherein the quality of the shear surface is assessed as inadequate when the course of the measured pressure force prior to an end of the shearing operation drops to a value that is less than or equal to zero.

12. The method according to claim 1, wherein in the event of inadequate quality of a shear surface of the end section, a change is made to an operating mode in which the action of pressure force on the end section to be sheared takes place in a force-controlled manner, wherein the pressure force exerted by the longitudinal stop on the end section to be sheared is controlled according to a predefined force control variable.

* * * * *